United States Patent [19]

James et al.

[11] Patent Number: 4,983,007
[45] Date of Patent: Jan. 8, 1991

[54] OPTICAL COUPLING DEVICE

[75] Inventors: Simon M James, Woodbridge; Mark Davison, Sunderland; Stephen Hornung, Diss; Michael H. Reeve, Ipswich, all of England

[73] Assignee: British Telecommunications, London, England

[21] Appl. No.: 399,503

[22] PCT Filed: Mar. 24, 1988

[86] PCT No.: PCT/GB88/00225

§ 371 Date: Sep. 11, 1989

§ 102(e) Date: Sep. 11, 1989

[87] PCT Pub. No.: WO88/07689

PCT Pub. Date: Oct. 6, 1988

[30] Foreign Application Priority Data

Mar. 24, 1987 [GB] United Kingdom ............... 8706929

[51] Int. Cl.$^5$ .............................................. G02B 6/26
[52] U.S. Cl. ............................. 350/96.15; 250/227.24
[58] Field of Search ............... 350/96.15; 250/227.14, 250/227.15, 227.17, 227.24

[56] References Cited

U.S. PATENT DOCUMENTS

| | | | |
|---|---|---|---|
| 3,910,677 | 6/1975 | Becker et al. | 350/96.15 |
| 3,931,518 | 9/1976 | Miller | 250/227.24 |
| 3,936,631 | 10/1976 | Muska | 250/227.24 |
| 4,436,365 | 7/1984 | Hodgins et al. | 350/96.16 |
| 4,679,907 | 4/1987 | Campbell et al. | 350/320 |
| 4,881,791 | 11/1989 | Mallison et al. | 350/96.15 X |
| 4,889,403 | 12/1989 | Zucker et al. | 350/96.15 |
| 4,914,665 | 4/1990 | Sorin | 350/96.15 X |

FOREIGN PATENT DOCUMENTS

| | | |
|---|---|---|
| 0080815 | 5/1983 | European Pat. Off. . |
| 0103467 | 1/1984 | European Pat. Off. . |
| 0106505 | 7/1984 | European Pat. Off. . |
| 0170511 | 2/1986 | European Pat. Off. . |
| 0171246 | 2/1986 | European Pat. Off. . |
| 0212877 | 3/1987 | European Pat. Off. . |
| 2841133 | 4/1980 | Fed. Rep. of Germany . |
| 3011663 | 2/1981 | Fed. Rep. of Germany . |
| 2942664 | 4/1981 | Fed. Rep. of Germany . |
| 50-100122 | 6/1975 | Japan . |
| 50-67788 | 12/1975 | Japan . |
| 51-149822 | 8/1976 | Japan . |
| 53-59821 | 11/1978 | Japan . |
| WO84/02006 | 3/1984 | PCT Int'l Appl. . |
| WO84/02005 | 7/1984 | PCT Int'l Appl. . |
| 2100463 | 6/1982 | United Kingdom . |
| 2115948 | 9/1983 | United Kingdom . |

OTHER PUBLICATIONS

Masayuki Fujise et al.—"Core Alignments by a Simple Local Monitoring Method"—Aug. 1, 1984/vol. 23, No. 15/Applied Optics, pp. 2643-2648.
Review of the Electrical Communications Laboratories, vol. 31, No. 3, 1983, "Measurement Technique for Single-Mode . . . ", Nakazawa et al., pp. 290-298.
Electronics Letters, Nov. 11, 1982, vol. 18, No. 23, "Fibre-Optic Variable Delay Lines", Bowers et al., pp. 999-1000.
Applied Optics, vol. 15, No. 10, Oct. 1976, "Single Mode Optical Fiber Pickoff Coupler", Hsu et al., pp. 2310-2312.
Electronics and Communications in Japan, vol. 66-B, No. 11, 1983, "Design and Charac. of Optical Power Meter, etc.", Maekawa et al., pp. 94-100.
IEE Proceedings, vol. 132, Pt. J, No. 5, Oct. 1985, "Low-Loss Single-Mode Optical Couplers", Georgiou et al., pp. 297-302.
J. Opt. Soc. Am. A., vol. 2, No. 5, May 1985, "Evanescent-Field Coupling Between Monomode Fiber, etc.", Lamouroux et al., pp. 759-964.

Primary Examiner—John D. Lee
Assistant Examiner—Phan T. Heartney
Attorney, Agent, or Firm—Nixon & Vanderhye

[57] ABSTRACT

A coupling device couples low power levels of optical radiation out of an optical fibre (3) for maintenance and fault-finding purposes. The assembled coupling device acts to clamp a fibre (3), with its primary plastics coating still in place, against the inner side of a gently curved silica rod (1). The rod (1) is strongly waveguiding and, picking up radiation leaked from the fibre (3), directs it to a photodetector (6). The device finds particular application in optical communications systems.

15 Claims, 2 Drawing Sheets

OPTICAL COUPLING DEVICE

FIELD OF THE INVENTION

The present invention relates to optical coupling devices. It finds particular application in maintenance, or fault finding, in optical communications systems,

BACKGROUND AND SUMMARY OF THE INVENTION

It is sometimes advantageous to couple optical radiation into or out of a waveguide at a point other than at an end. For instance, which jointing optical fibres it is known to align the fibre ends to be jointed by feeding light from one fibre end into the other and maneuvering them relative to one another to maximise coupling between the fibre ends. To do so, a bend is produced in the fibres to each side of the jointing region and the light is injected at the bend in one fibre and monitored by picking it off at the bend in the other fibre.

Although this technique for injecting and picking off light has the advantage that little preparation of the fibre has to be done, that is, it can be carried out for instance through a protective polymer coating carried by a fibre, there are circumstances in which it is unsuitable. The technique injects a relatively high power level of light and picks off as high a proportion of the light injected as possible. There are applications in which it is still advantageous to pick off radiation at a point along a fibre other than at an end, but in which it is preferable that only low power levels are picked off. For instance, in an optical fibre communications system, one may wish to detect a malfunctioning fibre amongst working fibres. If one were to test for the malfunctioning fibre by picking off high power levels from random fibres, the transmission of one or more working fibres is likely to be interfered with.

Optical couplers are known which can be used to couple an adjustable power level of light into or from an optical fibre but they rely on careful preparation of the fibre. For instance, in one type, the core glass of the fibre has to be brought close to the fibre surface by mounting the fibre in a curved position and polishing away the cladding glass on the outside of the curve until fibre core glass is almost exposed. Light is then coupled into and out of the exposed core of the fibre by controlling the relative position of a second fibre which has been polished in the same manner.

Optical couplers of this type suffer from the disadvantages that they are time-consuming and expensive to produce. A monomode fibre typically has an outer diameter of 125 μm and a core diameter of only 9 μm. Hence it is difficult to control the polishing steps with sufficient accuracy. The couplers are also limited in that they can only be used at predetermined fixed positions along a prepared fibre. Further, the fact that the arrangement tends to be vulnerable and unsuitable for use in the field.

It is an object of the present invention to provide an optical coupling device which can conveniently be used to test optical fibres in use in an optical communications system.

According to the present invention there is provided an optical coupling device, for coupling low power levels of optical radiation out of an optical waveguide having a refractive index of $n_1$ at or near its surface, comprising a pick-up element having a refractive index $n_3$ and providing a curved optical waveguiding path therein, and clamping means for clamping the optical waveguide into a curved position which at least substantially conforms to the inner side of the curved path, the refractive indices of the pick-up element and the surface of the optical waveguide, $n_3$ and $n_1$, and the radius of curvature, $R$, in mm of the inner surface of the curved path portion of the pick-up element being chosen such that $n_3 > n_1(1 - 0.125/R)$: such that optical radiation is leaked from the optical waveguide in use, and coupled into the curved path.

It has been found that a relatively simple coupling device can be designed according to embodiments of the present invention which will pick up sufficient radiation from for instance an optical fibre to check whether the fibre is functioning, without significantly disturbing a communications system dependent on the functioning of the fibre.

A waveguiding path in this context is intended to mean a path along which optical radiation will be guided by means of the distribution of refractive index in the materials of the waveguiding path. In general, a waveguiding path will comprise in cross section a core region of one refractive index, surrounded by a cladding region of a lower refractive index or range of refractive index.

In order that optical radiation coupled into the curved path does not return to the optical waveguide, the refractive index of the material of the path should preferably be greater than that of the optical waveguide.

Conveniently the pick-up element may comprise a solid curved rod of a dielectric material such as silica. The clamping means may act to clamp the optical waveguide against the inner side of the curved path; for instance where a rod is used, against the inner side of the curved rod.

The clamping means may comprise a block of material having a convex surface which corresponds in shape to the inner side of the curved, waveguiding path, a groove being provided in the convex surface to locate the optical waveguide, and means to hold the block and pick-up element together so as to grip an optical waveguide positioned in the groove.

The radiation from a curved waveguide does not leak away uniformly with distance along the waveguide, but in a series of discrete, well-defined, tangential beams. These beams form a divergent pattern, angular separation of the beams being a function of bend radius of the waveguide. Both the bend radius and the length of the optical waveguide which is curved are factors which affect the power level of optical radiation coupled out of the optical waveguide. For optical communications systems, using 1300 nm radiation transmitted by monomode fibres, a suitable radius of curvature of a fibre to couple out sufficient power for testing purposes without significantly degrading transmission has been found to be of the order of 15 mm, the total length of curved fibre subtending an angle of about 120°. Using such an arrangement, the loss introduced to the system may be of the order of only 3 dB.

We have also found that efficient coupling is facilitated by extending the pick-up element so that it and the optical fibre are aligned not just over the aforesaid curved portion, but also over a straight path thereafter. Although the length of the straight portion is not finely critical, we have found that optimum performance is obtained when it is about twice the diameter of the bend. Shorter lengths can be used of course but satisfactory coupling out of the cladding modes is increasingly difficult to achieve as this length is reduced. Greater lengths can be used where they are not inconvenient and where attenuation in the pick-up element is not a problem, but in general little useful power remains in the cladding much beyond the double diameter point.

It has been found that devices according to embodiments of the present invention can couple power levels of optical radiation out of an optical fibre which has a primary protective plastic coating intact as low as about 1 nW. To avoid significant interference with a monomode fibre communications system, typically the power level of the optical radiation coupled out of a fibre should be less than or equal to 50% of the average power level of optical radiation being transmitted by the fibre.

A coupling device may conveniently be applied to an optical fibre at a point in a communications system where the primary coating of the fibre is exposed for routing purposes. For instance, this is generally the case in joint housing, and at distribution points.

BRIEF DESCRIPTION OF THE DRAWINGS

An optical coupling device according to an embodiment of the present invention will now be described, by way of example only, with reference to the accompanying figures in which.

The figures are not drawn to scale.

DETAILED DESCRIPTION OF THE DRAWINGS

Figure 1:
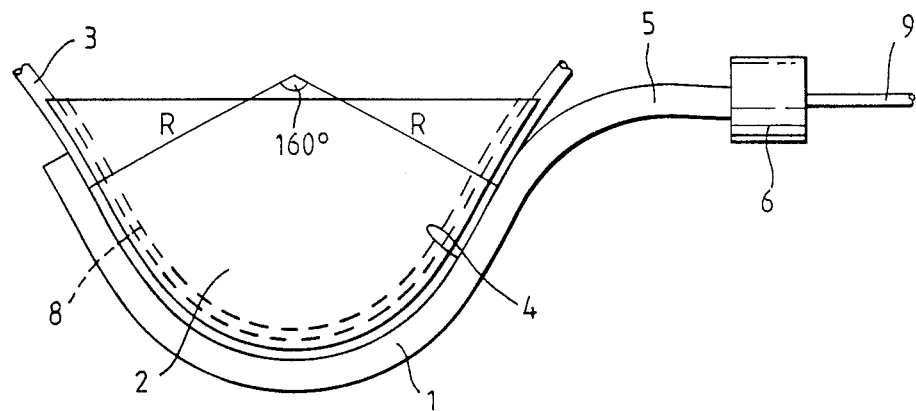
FIG. 1 shows a side elevation of the optical coupling device in use.

Referring to FIG. 1, the optical coupling device comprises a silica rod 1 having a curved and a straight portion, and a block 2, which co-operate to clamp an optical fibre 3 against the inner surface 4 of the curved portion of rod 1. Optical radiation which leaks out of the clamped optical fibre 3 in use is than picked up by the curved portion of rod 1 and guided to a photodetector 6 to be converted to an output signal.

Figure 1A:
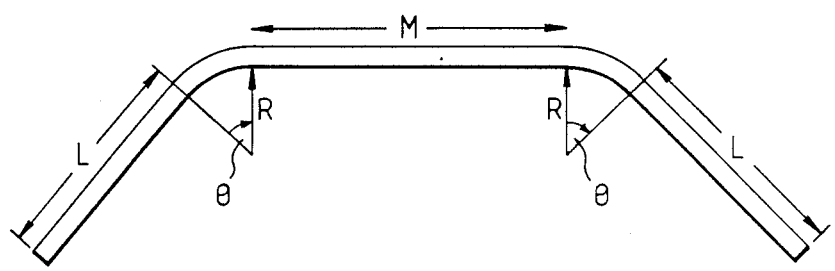
FIG. 1a shows an embodiment where the pick-up rod includes an extended straight portion.

Preferably, as indicated above, the curved portion of the rod is followed by an extended straight portion against which the fibre is also clamped. Such an arrangement is shown in FIG. 1a. In this example the angle $\theta°$ is 30°, the lengths L and M are each 20 mm, and the radius R is between 3 and 11 mm.

Figure 2:
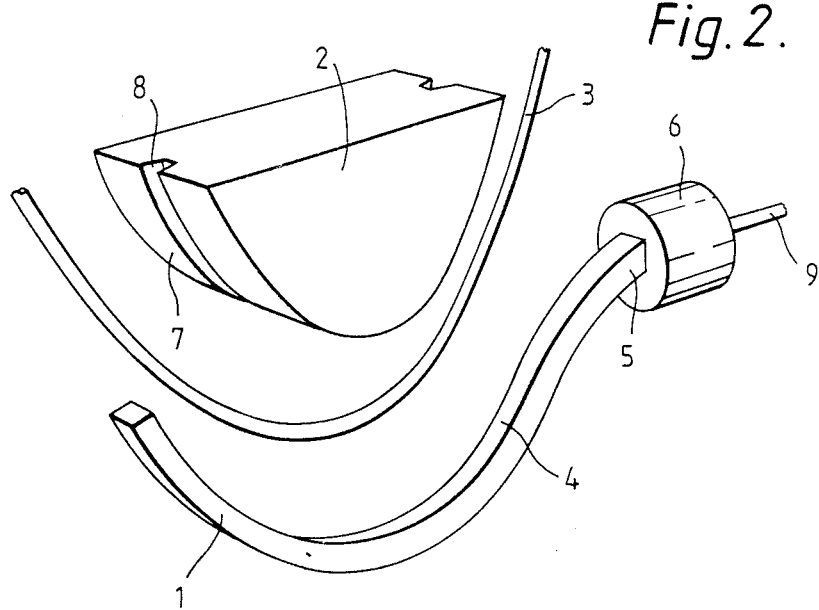
FIG. 2 shows an exploded, three-quarter view of the optical coupling device of FIG. 1.

Referring to FIG. 2, the rod 1 has a square cross section with sides of 2 mm. The curved portion has a substantially constant radius of curvature R (to the inner surface 4) of 8 mm, and subtends an angle of 160° at its centre of curvature. The end of the rod 1 adjacent the curved portion is polished to give a smooth finish.

A convenient method of making the rod 1 is to cut a 2 mm annular length from the end of a silica tube, the tube having a 16 mm internal diameter, and 2 mm wall thickness. Each flat end face of the annular length is polished and a segment then removed, to leave a C-shaped portion. One end of the C-shaped portion is then straightened outwards to form the straight portion of the rod 1.

Mounted on the end of the rod 1 adjacent the straight portion is the photodetector 6. Devices suitable for use in detecting light in these circumstances are known and further details are not therefore given. Clearly it will be necessary, however, that whatever is used to detect the light must be capable of responding to optical power levels as low as those which will be encountered in use of the coupling device.

The block 2 comprises an optically opaque plastics material and has a side elevation which is substantially D-shaped. It is flat-sided and has a thickness of about 20 mm. The major part of the curved surface 7 is curved to match the shape of the inner surface 4 of the curved portion of the rod 1. The length of the curved surface 7 is greater than that of the rod's inner surface 4, however, so that when the coupling device is assembled, as shown in FIG. 1, the block 2 protrudes from the curved portion of the rod 1.

The curved surface 7 of the block 2 is provided with a central, V-profile groove 8. The groove 8 is 0.1 mm deep and its sides meet at 60°. This allows it to locate a monomode optical fibre 3 which has its primary protective plastics material coating in place, the fibre 3 projecting slightly from the groove 8. Typically such a fibre, for use in an optical communications system, will have an outer diameter of about 250 $\mu$m.

Means are provided (not shown) for holding the block 2 and rod 1 together so that a fibre 3 located in the groove 8 is brought into contact with the inner surface 4 of the curved portion of rod 1. A simple, spring clip device or the like is suitable for holding the block 2 and rod 1 together, the force exerted by the device being sufficient to retain the coupling device in an assembled position without causing damage to the protective plastics material coating of the fibre 3. Alternatively, the block 2 and rod 1 may be pivotally coupled together so than an optical fibre 3 may be gripped between them as in a pair of pliers.

The output 9 from the photodetector 6 may be coupled to any equipment which it is intended should respond to it. For instance this may be a simple indicator, such as a light emitting diode, to show whether or not optical data is being transmitted by the fibre 3 under test.

In use, a fibre 3 to be tested is placed between the block 2 and the curved rod 1, lying in the groove 8 of the block 2. The fibre 3 is gripped sufficiently tightly to distort the primary coating slightly, into the groove 8 and against the rod 1. Because the fibre protrudes from the groove 8, the curved rod 1 is held away from the block 2 by the fibre 3. This means that the silica walls of the rod 1 are surrounded by air, except where the protective coating of the fibre 3 contacts the rod 1. The refractive index of the material of the rod is 1.49. Hence, except where radiation is to be coupled into the rod 1, the walls of the rod 1 in combination with the air fulfil the criterion of a waveguiding path. That is, together they constitute a core region of one refractive index (the silica rod 1) surrounded by cladding regions of a lower refractive index (the air). Because the difference in refractive indexes of the two regions is relatively high, 0.49, the rod 1 is strongly waveguiding and acts to "capture" a significant proportion of the optical radiation which might be leaked from the fibre 3.

It may be found advantageous to use an index matching material, such as a fluid or gel, to couple the optical radiation out of the fibre 3 into the rod 1.

By using a block 2 of optically opaque material, the block 2 acts an an optical seal. It acts to reduce the amount of extraneous radiation, not carried by the fibre 3, which might enter the rod 1 and affect the response of the photodetector 6.

It is important that optical radiation leaked from the optical fibre 3 in use of the coupling device is not only picked up by the rod 1 but also guided to the photodetector 6. In view of the fact that the rod 1 is curved in the same manner as the optical fibre 3, there is a possibility that the radiation leaked from the fibre 3 will equally leak from the rod 1. If the rod 1 designed to be too strongly guiding, then there can be a difficulty in getting radiation out of the rod 1 to the detector 6.

Figure 3:
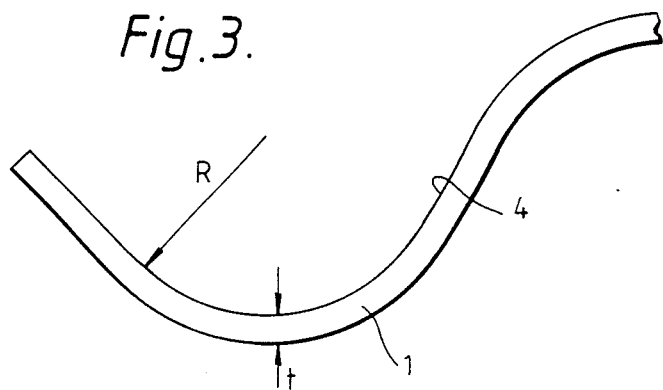
FIG. 3 shows a side elevation of a component of the device of FIG. 1.

Referring to FIG. 3, in order to design a useful coupling device according to an embodiment of the present invention, the following relationships should be applied:

$$n_3^2 < (n_1^2(1-0.25/R) + (0.125/R)^2 + 1) \quad \text{(i)}$$

$$n_3 > (n_1(1-0.125/R)) \quad \text{(ii)}$$

$$t < 0.44R - 0.18 \quad \text{(iii)}$$

where
$n_3$ is the refractive index of the rod material;
$n_1$ is the refractive index of the optical fibre cladding material (i.e. the material at the fibre surface);
t is the thickness in mm of the rod 1 in the plane normal to the interface between the rod 1 and the fibre 3 (not shown); and
R is the radius of curvature in mm of the inner surface 4 of the curved portion of the rod 1.

The upper limit given for $n_3$ by relationship i) is designed to allow the radiation picked up by the rod 1 to exit to the photodetector 6 rather than be reflected at the end of the rod 1. Use of an index matching material between the rod end and the detector or whatever is at the end of the rod may enable this limit to be exceeded. The lower limit given by relationship (ii), in combination with the t, R relationship (iii), is designed to cause internal reflection of radiation picked up by the rod 1 at the outer side of the curved portion of rod 1, thus preventing too significant losses from the rod 1.

Each of the relationships (i) to (iii) is given for a rod 1 surrounded by air. If the optical fibre 3 is a monomode fibre of the type commonly in use today in optical communications, then the refractive index $n_1$ will have the value 1.456.

The second two relationships in particular, designed to reduce losses at the outer side of the curved portion of rod 1, are calculated with regard to radiation leaving the optical fibre 3 tangentially and are not intended as strict mathematical treatments of the design limits of a design coupler as described.

Where the radius of curvature and/or the thickness of the rod are not constant, satisfactory results should still be obtained if the relationships are each satisfied for every part of the rod that contributes to the coupling.

Using optical radiation of wavelength 1.3 μm in the fibre 3, it has been found that an optical coupling device as described above, having the relevant associated values R=8 mm, t=2 mm, $n_1$=1.456, and $n_3$=1.49, produced 3 dB loss in the signal carried by the fibre 3 and had 20% efficiency. That is, of the radiation leaked from the fibre 3, about 20% was collected and guided to the photodetector 6. If the optical radiation is of wavelength 1.5 μm, then the loss from the fibre 3 is increased. If the radiation is left at 1.3 μm but the radius of curvature R referred to above is decreased to 6 mm or 5 mm, then the loss from the fibre 3 is increased to about 6 dB and 10 dB respectively.

To reduce losses at the interfaces produced by the primary coating of the fibre 3 with the cladding of the fibre 3, and with the rod 1, preferably the refractive index of the primary coating should lie between that of the fibre cladding, $n_1$, and that of the rod 1, $n_3$.

Variations may be made from the above described embodiment of the present invention. For instance the rod 1 may have a circular, or other rounded, cross section. Instead of having just rod-like member to pick up radiation leaking from the fibre 3, it may be found convenient to use some larger structure which has a curved waveguiding path embedded therein. For instance, this might have the advantage that it would then be possible to mount the block 2 directly into a structure by means of, for instance, a snap fitting. In this way, the need for independent means to hold the rod 1 and block 2 together would be avoided. Further, the structure used could enable the fibre in an assembled coupling device to be protected from damage.

In another alternative arrangement, two photodetectors may be used, for instance one being mounted at each end of the rod 1. This introduces directivity, useful if the fibre 3 concerned is carrying duplex transmissions, or could be used to improve sensitivity by cancelling background effects.

Although in the device described above, the curved portion of the rod 1 subtends an angle of 160° at the centre of curvature, this angle can be varied. For instance it might be reduced to 60° or increased to 180°. However, if it is reduced too much, the device tends to become insensitive in that either sufficient light can not be leaked from the fibre 3 for the photodetector 6 to distinguish or the amount leaked has to be leaked over such a short distance that the losses from the fibre 3 are difficult to predict. If the angle were to be increased beyond 180°, the device becomes physically more difficult to apply to a fibre.

It is not of course necessary that the curved portion of rod 1, or other curved, optical waveguiding path, should conform to part of a circle. That is, the associated radius of curvature does not have to be constant. If it is not, then the angle between the normals to the curved path, at each end of that path, should preferably meet at an angle which lies in the range from 60° to 180° inclusive, more preferably from 90° to 180° inclusive.

Although described above for use with a primary-coated optical fibre, a coupling device according to an embodiment of the present invention may alternatively be used with a fibre having a further secondary coating in place, for instance of nylon or other material, as used in optical fibre cable technology for additional protection.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:
1. An optical coupling device, for coupling low power levels of optical radiation out of an optical waveguide having a refractive index of $n_1$ at or near its sur- face, comprising a pick-up element having a refractive index $n_3$ and providing a curved optical waveguiding path therein, and clamping means for clamping the optical waveguide into a curved position which at least substantially conforms to the inner side of the curved path, the refractive indices of the pick-up element and the surface of the optical waveguide, $n_3$ and $n_1$, and the radius of curvature, R, in mm of the inner surface of the curved path portion of the pick-up element being chosen such that $n_3 > n_1(1 - 0.125/R)$, R being greater than or equal to 3, such that optical radiation is leaked from the optical waveguide in use, and coupled into the curved path.

2. An optical coupling device, for coupling low power levels of optical radiation out of an optical waveguide having a refractive index of $n_1$ at or near its surface, comprising a pick-up element having a refractive index $n_3$ and providing a curved optical waveguiding path therein, and clamping means moveable relative to the pick-up element for clamping the optical waveguide into a curved position which at least substantially conforms to the inner side of the curved path, the clamping means acting in use to clamp the optical waveguide against the inner side of the curved path, the refractive indices of the pick-up element and the surface of the optical waveguide, $n_3$ and $n_1$, and the radius of curvature, R, in mm of the inner surface of the curved path portion of the pick-up element being chosen such that $n_3 > n_1(1 - 0.125/R)$, such that optical radiation is leaked from the optical waveguide in use, and coupled into the curved path.

3. A device according to claim 1, wherein $n_3^2 < (n_1^2(1 - 0.25/R) + (0.125/R)^2 + 1)$.

4. A device according to claim 1, wherein the thickness of the pick-up element in mm in the plane normal to the interface between the pick-up element and the optical waveguide is less than $0.44R - 0.18$.

5. A device according to claim 1, wherein the pick-up element is rigid and self-supporting.

6. A device according to claim 1, wherein the clamping means acts to clamp the optical waveguide against the inner side of the curved path.

7. A device according to claim 1, wherein the pick-up element comprises an optically transparent rod.

8. A device according to claim 7, wherein the rod has a rectangular cross section.

9. A device according to claim 1, wherein the clamping means comprises a block of material having a convex surface, a groove being provided in the convex surface to locate the optical waveguide over the convex surface.

10. A device according to claim 1, wherein the normals to the curved path, at each end of that path, meet at an angle that lies in the range from 90° to 180° inclusive.

11. A device according to claim 1, wherein the curved path has at least a section which has a constant radius of curvature.

12. A device according to claim 1, wherein the optical waveguide is an optical fibre.

13. A device according to claim 12, wherein the fibre has a primary protective coating of plastics material.

14. A device according to claim 1, wherein the optical loss introduced to the optical waveguide is less than or equal to 6 dB.

15. A device according to claim 14, wherein the optical loss introduced to the optical waveguide is less than or equal to 3 dB.

* * * * *